United States Patent Office 2,738,278
Patented Mar. 13, 1956

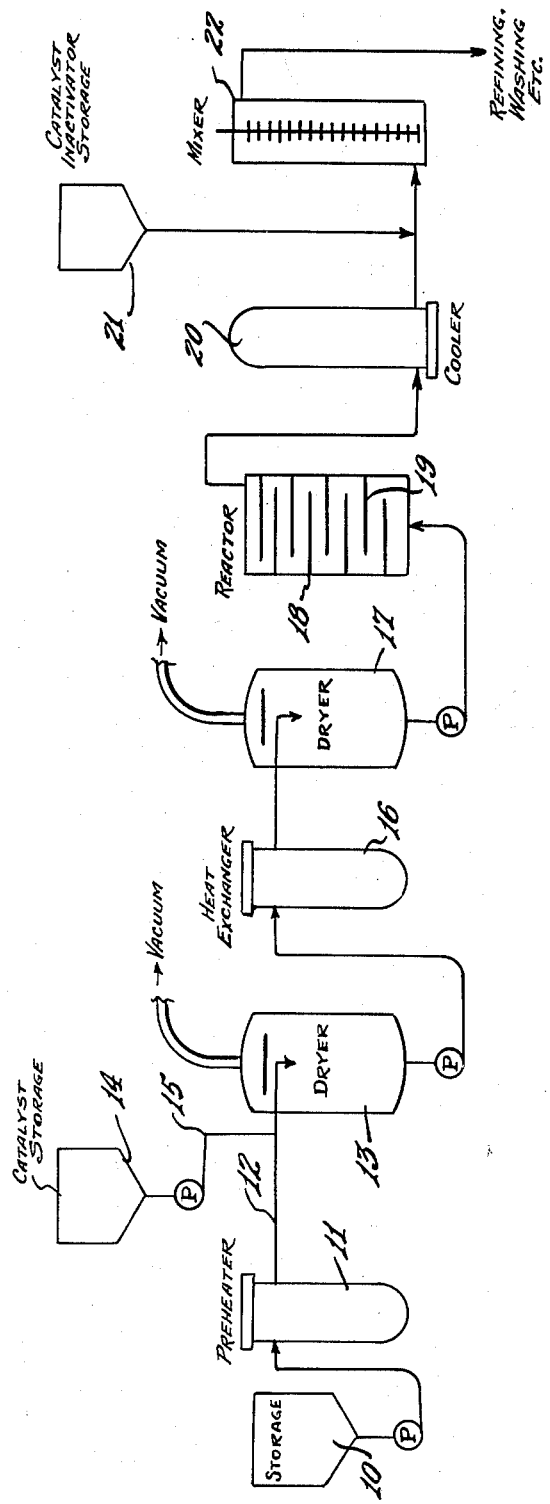

2,738,278

CATALYTIC INTERESTERIFICATION

George W. Holman, Thomas B. Laycock, Jr., and Robert L. Wille, Cincinnati, Ohio, assignors to The Procter & Gamble Company, Cincinnati, Ohio, a corporation of Ohio Application April 28, 1954, Serial No. 426,134

12 Claims. (Cl. 99—118)

The present invention relates to the catalytic molecular rearrangement of esters, and more particularly to catalyzed molecular rearrangement reactions involving the use of alkali metal hydroxide as activator. Specifically, the invention relates to a process for conducting such reactions and effecting catalysis with the aid of an alkali metal hydroxide added in the form of an aqueous solution. The invention is readily adapted to batch, continuous, or semi-continuous operation.

It is known that the use of alkali metal hydroxides in molecular rearrangement procedures catalyzes the reaction, but as far as we are aware this art is limited to the direct addition of the hydroxide in finely divided, solid form, usually as a suspension in a non-aqueous inert solvent such as xylene, toluene, or kerosene fractions. The use of such suspensions has at least two disadvantages. First, it is necessary to reduce the solid hydroxide to fine particle form in order that it may produce the desired catalysis in the molecular rearrangement reaction, and, accordingly, the material must be ground or otherwise converted to pulverulent form prior to admixture with the ester. Second, the inert solvent constitutes a foreign substance which, especially in the case of edible products, is preferably removed at some stage of processing to enable intended use. The step of deodorization, of course, can be conducted in such manner as to accomplish solvent removal, but it is difficult to recover the solvent economically in a form capable of reuse and therefore employment of the solvent as a dispersion vehicle usually represents a net loss. Moreover, in commercial installations, the handling of combustible solvents presents undesirable fire and explosion hazards.

To our knowledge the use of aqueous solutions of alkali metal hydroxides has not heretofore been practical in effecting catalytic molecular rearrangement in esters, primarily because of the power of the hydroxide in such form to react with or saponify the ester, thereby being consumed by the ester and losing its ability to activate the reaction efficiently.

It is an object of the present invention to provide a procedure for the effective employment of aqueous alkali metal hydroxide solutions in the catalysis of molecular rearrangement reactions.

A further object is to provide a continuous process for molecular rearrangement of esters in which economical sodium hydroxide, in aqueous solution, is directly used as a source of catalytic material.

A still further object is to provide a continuous process for molecular rearrangement of triglycerides wherein aqueous alkali metal hydroxides are employed as source of catalytic material.

Another object is to provide economical and continuous process for the molecular rearrangement of lard.

A general description of the fundamentals of the present invention as applied in a preferred continuous process wherein such objects are achieved is as follows.

A flowing stream of aqueous alkali metal hydroxide is continuously introduced, in adequate amount for catalysis as more fully explained below, into a flowing stream of the ester material being subjected to molecular rearrangement. The mixture of ester and aqueous solution is promptly thereafter subjected to a substantially instantaneous drying procedure wherein the moisture level of the mixture is reduced to a point at which alkali metal hydroxide (or the catalytically active substance formed therefrom) will catalyze rearrangement before all hydroxide is consumed by saponification, i. e., by reaction with fatty matter to form soap. As more fully described below the aqueous hydroxide solution can be introduced into a vessel containing the ester under suitable temperature, pressure, etc. conditions sufficient to cause substantially instantaneous or "flash" removal of moisture and dispersion of solid hydroxide in finely divided form throughout the ester, or the mixture of the ester and hydroxide solution can be subjected to such instantaneous drying. Subject to meeting the requirements of moisture removal before complete consumption of hydroxide, the ester in this latter alternative can be preheated prior or subsequent to the addition of the hydroxide solution. By such procedures, alkali metal hydroxide becomes uniformly dispersed throughout the ester at a moisture level which enables efficient catalysis of the rearrangement reaction which then can be effected.

The present invention is applicable to all ester molecular rearrangement reactions, including, for example, interesterification, alcoholysis, and other reactions whereby a redistribution of acid radicals is effected within an ester system. Recently such reaction has found commercial utility in the intermolecular rearrangement of lard preparatory to conversion into a plastic shortening product. It will therefore be convenient to describe the invention in terms of its use in the treatment of lard, but it is to be understood that the various advantages to be derived from the use of aqueous solutions of alkali metal hydroxides accrue in the use of the invention in all other ester systems including tallow, palm oil, cottonseed oil, soybean oil, coconut oil, and the like, and mixtures thereof.

Reference is now made to Figure 1 which schematically charts an exemplary process embodying the present invention in continuous random molecular rearrangement of interesterification of lard in the liquid phase.

From storage tank 10 melted crude lard is conducted at a desirable rate of flow through a heat transfer device 11 wherein the temperature of the lard is raised, by the use of steam or similar heating medium, to assist in subsequent removal of moisture. A temperature such as 300° to 360° F. has been found suitable when a vacuum drying apparatus is employed.

The heated lard is then conducted through pipe 12 to a drying chamber 13, a stream of aqueous alkali metal hydroxide solution stored in tank 14 being conducted through pipe 15 and proportioned by suitable proportioning means, not shown, into the flowing stream of lard at a point just prior to discharge into the drying mechanism 13. Whether or not a mechanical device is provided for thoroughly mixing the combined streams, before drying, is optional. Adequate dispersion of sodium hydroxide can be achieved ultimately in the absence of mechanical agitation. Alternatively, the hydroxide and lard may be introduced separately into the drying chamber in suitably proportionate amounts.

In drying chamber 13, which is preferably operated under vacuum, substantially instantaneous vaporization or "flashing" of moisture from the mixture results, a noticeable drop in temperature of the lard-catalyst mixture accompanying the moisture removal unless means are provided for replacing the heat of vaporization of the moisture. It may be desirable to conduct the drying step in two stages, in which case auxiliary heat exchanger 16 and dryer 17 may be provided. The mechanism and specific processing steps employed to effect the drying operation are not limitations of the invention, but suitable means are preferably selected to effect reduction of the moisture content of the mixture to a level of less than 0.02% substantially instantaneously and before all alkali metal hydroxide is consumed by saponification. Simultaneously with the drying, the unvaporized solid alkali metal hydroxide is precipitated and becomes homogeneously dispersed throughout the lard in such finely divided form that it is readily activated to catalyze the rearrangement reaction effectively.

The dried lard with dispersed catalyst is then continuously delivered to and through a reaction zone 18, which can be an elongated coil, or a "hold" tank wherein the rate of flow is reduced, to provide time for reaction. We preferably employ a tank of enlarged diameter provided with suitable baffling means 19 to minimize end-for-end mixing within the tank as the mixture of lard and catalyst passes through. The volume of tank 18 is, of course, varied depending on the capacity of the system and the time required to effect the desired completeness of reaction.

The above specifically described steps can also be conducted in a semicontinuous manner by introducing proportioned flowing streams of aqueous hydroxide solution and lard into a batch reactor under vacuum until a charge is accumulated. As the constituents enter the reaction zone, water is vaporized or "flashed" off substantially instantaneously, thereby forming a dispersion of finely divided solid hydroxide in the lard. This mixture is then held in the reactor, preferably under agitation, at reaction temperature until desired rearrangement is effected.

Also, these same steps can be conducted batch-wise, the aqueous solution of alkali metal hydroxide being directed, for example, onto the surface of an agitated body of heated lard under reduced pressure, thereby enabling prompt and substantially complete removal of moisture from the system and conversion of hydroxide into catalytic form before complete consumption by saponification.

After the desired degree of reaction has been effected, the temperature is preferably reduced somewhat before catalyst inactivation, and in the continuous operation, this is effected by conducting the mixture to and through heat exchanger 20. To the cooled mixture is then continuously added, preferably with the aid of suitable proportioning means, a catalyst inactivator from storage tank 21. Water is the preferred material since it not only inactivates the catalyst, but also effects hydration of any soap formed by reaction of the hydroxide with the lard, thereby facilitating subsequent separation of such by-products by continuous centrifugation. The mixture of water and interesterified ester is passed through mixer 22 to effect homogeneous distribution, following which the mixture is directed to a centrifuge (not shown) in which separation of the refined, interesterified lard from soap stock and other impurities is effected.

The refined product, which now possesses combined fatty acid radicals in a rearranged distribution as compared with the original lard, may be further purified by water washing, vacuum drying, and filtering or continuous bleaching. Such refined and purified product, if desired, may then be subjected to hydrogenation, admixture with "tristearine" hard stock, deodorization and plasticizing, steps which are well known in the art.

The following specific examples are illustrative of the manner in which the invention may be practiced.

*Example 1.*—To a stainless steel vessel equipped with steam coil, electrical heaters, means for blanketing with inert gas and a mechanical agitator were added 35 parts by weight of lard. The absolute pressure in the charged vessel was reduced to 1½ inches of mercury and heat was applied to bring the temperature of the lard to 338° F., mechanical agitation being used throughout the heating period. Nitrogen gas was introduced into the lard to assist in the removal of moisture and air from the system, and 0.35% by weight of a 50% by weight solution of sodium hydroxide in water was directed onto the surface of the agitated heated lard, the water being vaporized substantially instantaneously. The introduction of nitrogen and agitation were continued during and after the addition of the sodium hydroxide. Analyses of samples, taken during the course of the subsequent reaction, indicated that rearrangement of the lard to random distribution was complete in about 15 minutes.

*Example 2.*—A stream of crude lard flowing at the rate of 68 pounds per hour was pumped continuously through a heat exchanger to raise the temperature to about 356° F. Into the flowing stream of a heated lard was continuously introduced a flowing stream of a 50% by weight aqueous solution of sodium hydroxide solution at the rate of about .25 pound per hour. The combined streams of lard and sodium hydroxide solution were substantially immediately introduced into the first stage of a two-stage tangential entry vacuum drier operated at an absolute pressure of 8 millimeters of mercury. Due to the evaporation of moisture, the temperature of the mixture dropped, and from the first stage of the drier the mixture was pumped through a second heat exchanger to raise the temperature to about 325° F. This reheated mixture was then passed through the second stage of the drier and then conducted through an elongated reaction coil wherein the temperature was held at 325°–330° F. and the average "hold" time was about 2 minutes. Analyses of samples of the treated lard being discharged continuously from the elongated coil indicated that rearrangement of the lard to random distribution was substantially complete.

An equivalent potassium hydroxide solution can be employed in place of the sodium hydroxide solution in the process of this Example 2.

*Example 3.*—A stream of crude lard flowing at the rate of 5,500 pounds per hour was continuously passed through a heat exchanger to raise the temperature to about 340° F. To this flowing stream of heated lard was added a flowing stream of a 50° Baumé sodium hydroxide solution in an amount equal to 0.203% by weight of anhydrous sodium hydroxide based on the lard. The combined streams were immediately introduced into the first stage of a two-stage drier operated at an absolute pressure of 11 millimeters of mercury. Moisture in the combined streams was vaporized substantially instantaneously and the dried mixture, containing about 0.01% moisture, was then reheated prior to introduction into the second stage wherein the moisture was further reduced to less than 0.004%. This substantially completely dried lard-hydroxide mixture at a temperature of about 327° F. was then pumped through a reaction coil wherein the average "holding" time was about 4⅓ minutes. Analyses on the lard continuously discharged from the reaction coil indicated that the rearrangement to random distribution was substantially complete.

The same process is applicable in effecting molecular rearrangement in other triglyceride mixtures, such as a mixture of coconut oil and substantially completely hydrogenated cottonseed oil.

*Example 4.*—Crude lard at a rate of about 4,000 pounds per hour was pumped through a heat exchanger to raise the temperature of the lard to about 345° F. Into the heated flowing stream of lard was introduced a flowing stream of a 40° Baumé aqueous solution of sodium hydroxide at a rate such that about 0.213% by weight of anhydrous sodium hydroxide based on the weight of the lard was continuously and proportionately added to the lard. This mixture was substantially instantaneously introduced into the first stage of a two-stage drier, the absolute pressure in the first stage being equal to about 26 millimeters of mercury. The mixture which was discharged from the first stage contained about 0.01% moisture and was reheated prior to introduction into the second stage of the drier which was operated at an absolute pressure of 12 millimeters of mercury. This drying operation was effective in reducing the moisture content to less than 0.004%. The dried mixture at a temperature of about 322° F. was then introduced into an elongated reaction coil, the average "holding" time being about 5 minutes. The temperature of the lard continuously discharged from the reaction coil was about 320° F. and analyses on samples of the product indicated that rearrangement of the lard to random distribution was substantially complete.

The crux of the invention lies in the reduction of the moisture in the ester-hydroxide mixture to a level at which hydroxide is activated for catalysis of the rearrangement reaction and in the execution of this step prior to consumption of hydroxide by saponification. It is therefore preferable either to remove moisture from the hydroxide solution as it is added to the ester, as by flash drying, or to subject the ester-hydroxide mixture to a similar substantially instantaneous drying step promptly after the mixture is formed. In the latter alternative, the time within which the drying must be effected will vary depending on the strength of the hydroxide solution, temperature, and other variables and cannot be defined with particularity unless such variables are stated. However, in the preferred continuous operation where a 30°–50° Baumé (about 25–50% by weight) sodium hydroxide solution is added to the glyceride at a temperature of 300°–350° F., reduction of moisture to the desired level within about one minute after formation of the mixture has been found satisfactory. At higher temperatures, the saponification reaction is more rapid and shorter periods of contact before removal of moisture are preferred.

It is preferable that the moisture content of the reaction mixture be reduced to less than 0.01% in order that a rapid rate of rearrangement may be achieved. However, the reaction will proceed at a moisture level up to 0.02%, but at rates which become lower as the moisture content increases. The presence of moisture tends to inhibit activation of the hydroxide to the catalytic form, and to enhance consumption of the hydroxide by saponification with the lard during the rearrangement reaction. Such undesirable effects of moisture appear to be offset at least partially by the presence in the reaction mixture of unesterified hydroxyl groups, existing, for example, in the form of glycerol or monoglyceride, so that higher moisture concentrations can be tolerated with such substances present without seriously affecting the reaction rate.

The amount of hydroxide available for catalysis under preferred conditions should be at least 0.10% based on the weight of the ester, and preferably from about 0.2% to about 0.5%. The availability of larger amounts can, of course, be provided for, but for economic reasons, such amounts do not normally exceed 2%.

In order that such amounts of hydroxide may be available for catalysis, provision must be made for the addition of an amount which will be consumed by saponification of ester resulting from delayed removal of moisture after addition of the aqueous solution of hydroxide, plus an amount which will be consumed by free fatty acid and other materials, such as peroxides, which react substantially instantaneously on contact with the hydroxide.

In the practice of the invention on lard which, for example, contains 0.25% to 0.35% of free fatty acid we have successfully employed from 0.15% to 0.6% sodium hydroxide in the form of a 50° Baumé (about 50% by weight) aqueous solution, about .10% to about 0.5% being available for catalysis. However, the free fatty acid content of the ester is not a critical factor in the successful practice of the invention. Lard normally contains less than 0.5% free fatty acid, but rearrangement to random distribution has been successfully completed with lards containing up to about 1¼% free fatty acid, and greater amounts can be tolerated, assuming, of course, that suitable provision is made for the addition of correspondingly higher amounts of alkali metal hydroxide required for neutralization of such greater amounts of acid.

Satisfactory results have also been obtained by the employment of an equivalent amount of more dilute solutions of sodium hydroxide such as 30° Baumé. Where practical for use, the more concentrated solutions, such as solutions at or near saturation, are preferred because less water need be evaporated in the drying step.

The aqueous solution of hydroxide may be introduced before or after the ester is heated, but introduction before heating usually requires a greater amount of hydroxide, probably because of the longer contact time and consequent higher consumption of hydroxide by soap formation.

It is preferred that the pressure in the dehydrating zone be subatmospheric, the actual pressure being varied depending on the efficiency of the apparatus in moisture removal. Absolute pressures from about 5 to about 25 millimeters of mercury have been used with satisfactory results.

Whether or not subatmospheric pressure is employed in the reaction zone is optional, but subatmospheric pressure has some advantages in that a low moisture level, suitable catalytic activity, avoidance of darkening and oxidation are thereby achieved.

While aqueous solutions of sodium hydroxide are preferred for use in practicing the invention due to ready availability and economy in use, other alkali metal hydroxides such as potassium hydroxide can be employed without the departing from the spirit of the invention.

The temperatures used in practicing the invention, both as to drying and rearrangement, are not critical and can vary within the range of about 225° F. to about 500° F. depending at least in part on the equipment being employed and the characteristics of the ester being treated, such as volatility, and susceptibility to thermal decomposition. The reaction rate of course varies with temperature, lower rates being observed at the lower temperatures. In our experience with lard, for example, adequate drying and good rates of reaction have been observed in the range of 300°–350° F., two-stage drying being employed to reduce the moisture content to the preferred range of less than 0.01%. At higher temperatures up to 500° F. reaction rates are higher, but caution must be exercised to avoid undue darkening or other thermal deterioration.

The time required for carrying the reaction to substantially complete or equilibrium randomization at 320–340° F. with moisture content at 0.01% or lower is 15 minutes or less and in efficient continuous operation can be five minutes or less, but again the reaction time will vary depending upon other processing conditions.

Desirable reaction time can be determined by establishing an endpoint in terms of cloud point or by some dilatometric method for measuring change in solids content at a given temperature. Analytical tools such as those for determining the course of rearrangement reaction under a given set of conditions are known in the art and form no part of the invention.

Lard and other glyceride esters which are capable of edible use and which have been randomly rearranged in accordance with the invention can be subjected to the conventional processing steps including hydrogenation, admixture with hardstocks, deodorization and plasticizing to convert the processed glycerides into a plastic shortening of improved quality.

Having thus described our invention, what we claim and desire to secure by Letters Patent is:

1. In the process of effecting molecular rearrangement in fatty esters in which the fatty ester is contacted with alkali metal hydroxide to catalyze the reaction, the steps of bringing together an aqueous solution of alkali metal hydroxide with said ester, the alkali metal hydroxide being in minor amount but sufficient to provide an amount for catalysis, and promptly reducing the moisture level of the mixture to less than 0.02% by weight to activate alkali metal hydroxide for catalysis prior to reduction of the concentration thereof below a catalytic amount as a result of saponification.

2. In the process of effecting molecular rearrangement in fatty esters in which the fatty ester is contacted with alkali metal hydroxide to catalyze the reaction, the steps of heating said ester, mixing an aqueous solution of alkali metal hydroxide with the heated ester at subatmospheric pressure, the alkali metal hydroxide being in minor amount but sufficient to provide an amount for catalysis, and reducing the moisture level of the mixture to less than 0.02% by weight to activate alkali metal hydroxide for catalysis prior to reduction of the concentration thereof below a catalytic amount as a result of saponification.

3. In the process of effecting molecular rearrangement in fatty esters in which the fatty ester is contacted with alkali metal hydroxide to catalyze the reaction, the steps of flashing an aqueous solution of alkali metal hydroxide into the heated ester under subatmospheric pressure, the amount of hydroxide being sufficient to make available for catalysis a catalytic amount of alkali metal hydroxide within the range of 0.1% to about 2%, and reducing the moisture level to less than 0.02% by weight to activate alkali metal hydroxide for catalysis prior to reduction of the concentration thereof below a catalytic amount as a result of saponification.

4. In the process of effecting molecular rearrangement in fatty acid esters in which the fatty ester is contacted with alkali metal hydroxide to catalyze the reaction, the steps of continuously mixing a concentrated aqueous solution of alkali metal hydroxide with the ester, the amount of alkali metal hydroxide being in minor amount but sufficient to make a catalytic amount available for catalysis of the rearrangement, and continuously reducing the moisture level in the system to less than 0.02% by weight by substantially instantaneous drying prior to reduction of alkali metal hydroxide content below a catalytic amount as a result of saponification.

5. In the process of effecting molecular rearrangement in fatty esters in which the fatty ester is contacted with alkali metal hydroxide to catalyze the reaction, the steps of introducing a flowing stream of an aqueous solution of alkali metal hydroxide into a flowing stream of said ester, the amount of alkali metal hydroxide being in minor amount but sufficient to make a catalytic amount available for catalysis of the rearrangement, promptly subjecting the combined streams to subatmospheric pressure and continuously reducing the moisture level of the mixture to less than 0.02% by weight prior to reduction of alkali metal hydroxide concentration below a catalytic amount as a result of saponification.

6. In the process of effecting molecular rearrangement in fatty esters in which the fatty ester is contacted with alkali metal hydroxide to catalyze the reaction, the steps of introducing and continuously flowing a stream of an aqueous solution of alkali metal hydroxide into a flowing stream of said ester, the amount of alkali metal hydroxide being in minor amount but sufficient to make a catalytic amount available for catalysis of the rearrangement, promptly subjecting the flowing stream of resulting dispersion to subatmospheric pressure and continuously reducing the moisture level of the dispersion to less than 0.02% by weight prior to reduction of alkali metal hydroxide concentration below a catalytic amount as a result of saponification.

7. In the process of effecting molecular rearrangement in fatty esters in which the fatty ester is contacted with alkali metal hydroxide to catalyze the reaction, the steps of introducing a flowing stream of an aqueous solution of alkali metal hydroxide into a flowing stream of said ester, continuously heating the combined streams, the amount of alkali metal hydroxide being in minor amount but sufficient to make a catalytic amount available for catalysis of the rearrangement, promptly subjecting the heated mixture to subatmospheric pressure and continuously reducing the moisture level to less than 0.02% by weight to activate alkali metal hydroxide for catalysis prior to reduction of the concentration thereof below a catalytic amount as a result of saponification.

8. In the process of effecting molecular rearrangement in fatty esters in which the fatty ester is contacted with alkali metal hydroxide to catalyze the reaction, the steps of flashing an aqueous alkali metal hydroxide solution into a drying zone under subatmospheric pressure simultaneously with the introduction of ester and promptly reducing the moisture content of the mixture to less than 0.02% by weight, the amount of alkali metal hydroxide being in minor amount but sufficient to make a catalytic amount available for catalysis of the rearrangement.

9. In the process of effecting molecular rearrangement in fatty esters in which the fatty ester is contacted with alkali metal hydroxide to catalyze the reaction, the steps of heating a flowing stream of ester to an interesterification temperature within the range of about 225° to about 500° F. but insufficient to cause substantial thermal deterioration of the ester, continuously introducing a flowing stream of an aqueous solution of an alkali metal hydroxide into the heated stream of ester, the amount of alkali metal hydroxide being in minor amount but sufficient to provide a catalytic amount within the range of 0.1% to about 2% during rearrangement, promptly injecting the mixture into a zone at subatmospheric pressure and reducing the moisture level to less than 0.02% by weight to activate alkali metal hydroxide for catalysis prior to reduction of the concentration thereof below a catalytic amount as a result of saponification.

10. In the process of effecting molecular rearrangement of lard in the presence of sodium hydroxide, the steps of heating a flowing stream of lard to a temperature within the range of about 300° F. to about 350° F., continuously introducing a flowing stream of an aqueous sodium hydroxide solution from about 30° Baumé to about 50° Baumé in strength in amount sufficient to neutralize free fatty acid of the lard and to provide an excess for catalysis, promptly and continuously flash drying the mixture to a moisture level less than 0.02% by weight to activate sodium hydroxide for catalysis prior to reduction of the concentration thereof below a catalytic amount as a result of saponification, allowing the mixture to rearrange molecularly at a temperature from about 300° F. to 350° F. while the mixture is being continuously advanced at a reduced rate of flow, and subsequently inactivating the catalyst.

11. In the process of effecting molecular rearrangement in fatty esters in which the fatty ester is contacted with alkali metal hydroxide to catalyze the reaction, the steps of flash drying an aqueous solution of an alkali metal hydroxide under subatmospheric pressure to form finely divided solid hydroxide, dispersing spray dried hydroxide in minor amount sufficient to provide a catalytic amount in said esters at a moisture level of less than .02% based on the mixture, maintaining the moisture level of the mixture below .02% whereby alkali metal hydroxide is activated for catalysis prior to reduction of the concentration thereof below a catalytic amount as a result of saponification, and allowing the esters to rearrange molecularly.

12. The process of claim 11 in which the aqueous alkali metal hydroxide solution is directed onto the surface of heated ester in the flash drying step.

References Cited in the file of this patent

UNITED STATES PATENTS

| | | |
|---|---|---|
| 2,442,531 | Eckey | June 1, 1948 |
| 2,625,485 | Dominick et al. | Jan. 13, 1953 |